(12) United States Patent
Yoshida et al.

(10) Patent No.: US 9,614,186 B2
(45) Date of Patent: Apr. 4, 2017

(54) ELECTRONIC DEVICE

(71) Applicant: Panasonic Corporation, Osaka (JP)

(72) Inventors: Hideki Yoshida, Kyoto (JP); Yo Hibino, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/845,971

(22) Filed: Sep. 4, 2015

(65) Prior Publication Data

US 2015/0380686 A1    Dec. 31, 2015

Related U.S. Application Data

(63) Continuation of application No. PCT/JP2013/004910, filed on Aug. 20, 2013.

(30) Foreign Application Priority Data

Mar. 13, 2013    (JP) .................................. 2013-050016

(51) Int. Cl.
H01L 51/52    (2006.01)
B32B 27/18    (2006.01)
B32B 27/08    (2006.01)

(52) U.S. Cl.
CPC .......... *H01L 51/5259* (2013.01); *B32B 27/08* (2013.01); *B32B 27/18* (2013.01);
(Continued)

(58) Field of Classification Search
CPC ............. H01L 51/5259; H01L 51/5268; H01L 51/5271
(Continued)

(56) References Cited

U.S. PATENT DOCUMENTS 6,268,695 B1 *    7/2001    Affinito ............... H01L 51/5256
                                                        313/504
6,465,953 B1    10/2002    Duggal
(Continued)

FOREIGN PATENT DOCUMENTS

JP    2002-056970    2/2002
JP    2005-339863    12/2005
(Continued)

OTHER PUBLICATIONS

International Search Report of PCT application No. PCT/JP2013/004910 dated Dec. 3, 2013.

*Primary Examiner* — Christine Enad
(74) *Attorney, Agent, or Firm* — McDermott Will & Emery LLP

(57) ABSTRACT

The present technique provides an electronic device, such as a flexible EL display device, including: first barrier film including a laminate of inorganic film including an inorganic material and polymer film including a polymer material; second barrier film including a laminate of inorganic film including an inorganic material and polymer film including a polymer material; and thin film transistor array device and light emitter both sealed with first and second barrier films. Polymer films each contain at least one type of nano fine particles selected from silica particles, Fe-based particles, montmorillonite particles, silica-coated particles, and zeolite particles, dispersed in the polymer material.

6 Claims, 2 Drawing Sheets

(52) U.S. Cl.
CPC ... *B32B 2264/102* (2013.01); *B32B 2264/105* (2013.01); *B32B 2457/00* (2013.01); *B32B 2457/20* (2013.01)

(58) Field of Classification Search
USPC .......................................................... 257/66
See application file for complete search history.

(56) References Cited

U.S. PATENT DOCUMENTS

| | | | |
|---|---|---|---|
| 6,849,877 B2 * | 2/2005 | Yamazaki | H01L 27/3244 257/290 |
| 7,397,183 B2 | 7/2008 | Schaepkens et al. | |
| RE40,531 E | 10/2008 | Graff et al. | |
| 7,486,020 B2 | 2/2009 | Schaepkens et al. | |
| 8,754,434 B1 * | 6/2014 | Gollier | H01L 51/5268 257/434 |
| 2004/0119068 A1 * | 6/2004 | Weaver | H01L 25/047 257/40 |
| 2010/0089636 A1 * | 4/2010 | Ramadas | B82Y 15/00 174/521 |
| 2011/0154854 A1 | 6/2011 | Boesch et al. | |
| 2011/0171764 A1 | 7/2011 | Toonen et al. | |
| 2011/0175101 A1 | 7/2011 | Hatano et al. | |
| 2011/0175102 A1 | 7/2011 | Hatano | |
| 2014/0050863 A1 | 2/2014 | Boesch et al. | |
| 2014/0054325 A1 | 2/2014 | Boesch et al. | |
| 2014/0252342 A1 * | 9/2014 | Ramadas | H01L 21/56 257/40 |

FOREIGN PATENT DOCUMENTS

| | | | |
|---|---|---|---|
| JP | 2010-511267 | 4/2010 | |
| JP | 2011-517011 | 5/2011 | |
| JP | 2011-171287 | 9/2011 | |
| JP | 2011-171288 | 9/2011 | |
| JP | 2012-086393 | 5/2012 | |
| SG | WO 2013062486 A1 * | 5/2013 | ............ H01L 21/56 |
| WO | 2008/057045 | 5/2008 | |
| WO | 2009/102201 | 8/2009 | |

* cited by examiner

ELECTRONIC DEVICE

TECHNICAL FIELD

The present technique relates to a flexible thin electronic device such as a flexible EL display device.

BACKGROUND ART

In recent years, next-generation display devices have been aggressively developed, and attention has been paid to electroluminescent (EL) display devices having a first electrode, a plurality of organic layers including a light-emitting layer, and a second electrode, which are stacked in order on a driver substrate. EL display devices have the following characteristics. They are self-emitting and thus have a wide viewing angle. They require no backlight and thus are expected to save power. They are highly responsive and can have a smaller thickness. Therefore, there has been a strong demand for the use of EL display devices for large screen displays such as television sets.

EL display devices are also promising flexible display devices because their light-emitting device can be formed on a flexible plastic substrate.

Unexamined Japanese Patent Publication No. 2005-339863 discloses that such a flexible EL display device has a structure including a film substrate, a light-emitting functional layer provided thereon, a sealing coating including an inorganic thin coating and formed to cover the whole of the light-emitting functional layer, and a barrier layer-containing sealing film bonded to the sealing coating with an adhesive.

SUMMARY

The present technique provides an electronic device, such as a flexible EL display device, including: a first barrier film including a laminate of an inorganic film including an inorganic material and a polymer film including a polymer material; a second barrier film including a laminate of an inorganic film including an inorganic material and a polymer film including a polymer material; and a device component including a thin film transistor device, a light emitter, and other parts and sealed with the first and second barrier films. The polymer films each contain at least one type of nano fine particles selected from silica particles, Fe-based particles, montmorillonite particles, silica-coated particles, and zeolite particles, dispersed in the polymer material.

According to the present technique, a small amount of water and oxygen molecules infiltrating from defects in the barrier film made of the inorganic material are allowed to be efficiently adsorbed on or to efficiently react with the fine particles dispersed in the polymer film. Such features make it possible to significantly reduce the amount of passage of water and oxygen molecules and to make the device thin, light, and flexible.

DESCRIPTION OF EMBODIMENTS

Hereinafter, an electronic device according to an exemplary embodiment of the present technique, specifically, an organic EL display device as an example, will be described with reference to FIGS. 1 to 3. It will be understood that the present technique can be advantageously used not only for organic EL display devices but for organic thin film solar cells and other electronic devices. The following should be noted. Some descriptions more detailed than necessary may be omitted. For example, detailed description of already well-known matters and repeated description of substantially the same features may be avoided. This is to avoid making the following description unnecessarily redundant and to facilitate the understanding by a person skilled in the art.

The inventors provide the attached drawings and the following description in order for a person skilled in the art to sufficiently understand the present technique, and do not intend to allow them to limit the subject matter recited in the claims.

Figure 1:
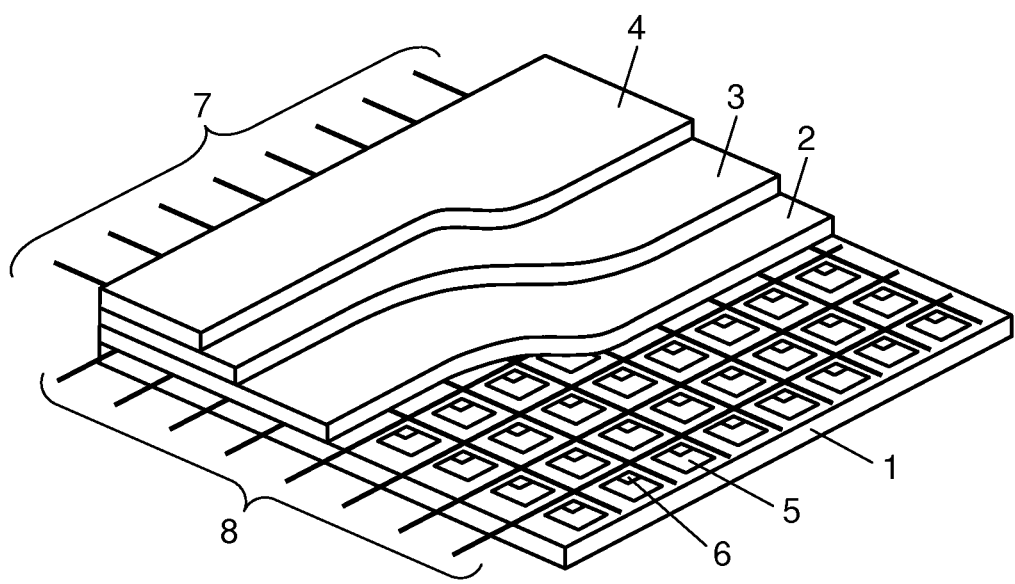
FIG. 1 is a perspective view of an organic EL display device as an example of an electronic device according to an exemplary embodiment of the present technique.
Figure 2:
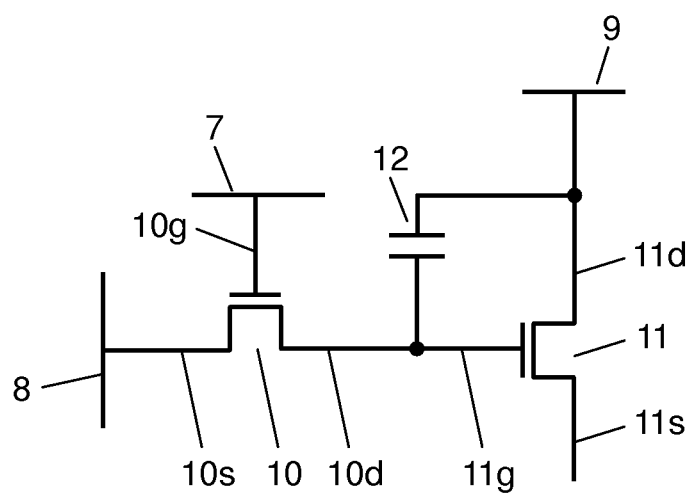
FIG. 2 is an electrical diagram illustrating the configuration of a pixel circuit.

FIG. 1 is a perspective view illustrating a general structure of an EL display device, and FIG. 2 is a diagram illustrating a configuration of a pixel circuit for driving a pixel.

As illustrated in FIGS. 1 and 2, the EL display device includes thin film transistor array device 1 and a light emitter. Thin film transistor array device 1 has a plurality of thin film transistors. The light emitter includes anode 2 as a lower electrode, light-emitting layer 3 including an organic material, and cathode 4 as a transparent upper electrode. The emission of light from the light emitter is controlled by thin film transistor array device 1. The light emitter has a structure in which light-emitting layer 3 is disposed between anode 2 and cathode 4, a pair of electrodes. A hole transport layer is formed between anode 2 and light-emitting layer 3 to form a stack, and an electron transport layer is formed between light-emitting layer 3 and transparent cathode 4 to form a stack. In thin film transistor array device 1, a plurality of pixels 5 are arranged in a matrix.

Each pixel 5 is provided with and driven by pixel circuit 6. Thin film transistor array device 1 includes a plurality of gate lines 7 arranged in rows, a plurality of source lines 8 arranged as signal lines in columns crossing gate lines 7, and a plurality of power supply lines 9 (not shown in FIG. 1) extending parallel to source lines 8.

Gate line 7 is connected in each row to gate electrode 10g of each thin film transistor 10 for operating as a switching element in each pixel circuit 6. Source line 8 is connected in each column to source electrode 10s of each thin film transistor 10 for operating as a switching element in each pixel circuit 6. Power supply line 9 is connected in each column to drain electrode 11d of each thin film transistor 11 for operating as a driver element in each pixel circuit 6.

As illustrate in FIG. 2, pixel circuit 6 includes thin film transistor 10 configured to operate as a switching element, thin film transistor 11 configured to operate as a driver element, and capacitor 12 configured to store data to be displayed on the corresponding pixel.

Thin film transistor 10 includes gate electrode 10g connected to gate line 7, source electrode 10s connected to source line 8, drain electrode 10d connected to capacitor 12 and gate electrode 11g of thin film transistor 11, and a semiconductor film (not shown). When a voltage is applied to gate line 7 and source line 8, thin film transistor 10 connected thereto allows capacitor 12 to store, as display data, the voltage applied to source line 8.

Thin film transistor 11 includes gate electrode 11g connected to drain electrode 10d of thin film transistor 10, drain electrode 11d connected to power supply line 9 and capacitor 12, source electrode 11s connected to anode 2, and a semiconductor film (not shown). Thin film transistor 11 supplies a current from power supply line 9 to anode 2 through source electrode 11s, in which the current corresponds to the voltage stored in capacitor 12. Therefore, the EL display device configured as described above uses an active matrix system in which display is controlled at each pixel 5 located at the intersection of gate line 7 and source line 8.

In the EL display device, the light emitter is configured to emit light of at least red, green, and blue. The light emitter has a plurality of pixels that each include at least red (R) light-, green (G) light-, and blue (B) light-emitting layers and are arranged in a matrix.

Figure 3:
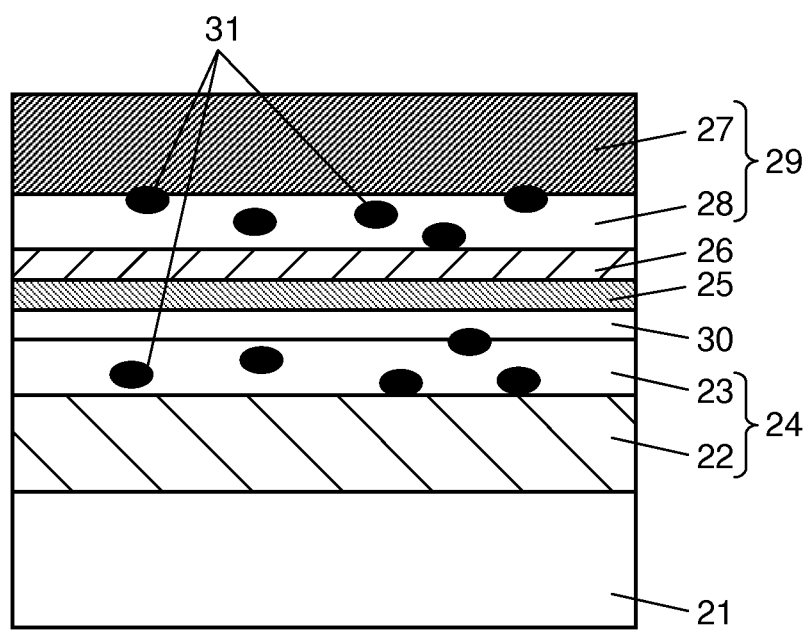
FIG. 3 is a schematic sectional view illustrating the structure of an organic EL display device according to an exemplary embodiment of the present technique.

FIG. 3 is a schematic sectional view illustrating the structure of an EL display device according to an exemplary embodiment of the present technique.

As illustrated in FIG. 3, the EL display device according to the present technique includes flexible substrate 21, first barrier film 24, thin film transistor array device (hereinafter referred to as TFT part) 25, and light emitter 26. First barrier film 24 is provided on substrate 21 and includes a laminate of inorganic film 22 including an inorganic material and polymer film 23 including a polymer material. Light emitter 26 includes an electrode and a light-emitting layer. TFT unit 25 and light emitter 26 are formed on substrate 21.

Light emitter 26 is covered and sealed with second barrier film 29 including a laminate of inorganic film 27 including an inorganic material and polymer film 28 including a polymer material. Planarization layer 30 is formed between first barrier film 24 and TFT part 25 on substrate 21.

FIG. 3 illustrates an example in which first barrier film 24 is disposed on substrate 21 whereas any substrate 21 is not disposed on second barrier film 29. It will be understood, however, that substrate 21 may also be disposed on second barrier film 29.

The features of substrate 21, such as shape, material, and size, are not restricted and may be appropriately selected depending on purpose. For example, substrate 21 may be a glass material such as a non-alkali glass or soda glass material, a silicon substrate, or a metal substrate. For light weight and flexibility, a polymer material may also be used to form substrate 21. Suitable examples of the polymer material include polyethylene terephthalate, polycarbonate, polyethylene naphthalate, polyamide, polyimide, and the like. Any of other known polymer materials such as acetate resin, acrylic resin, polyethylene, polypropylene, and polyvinyl chloride resin may also be used to form the substrate. When the polymer material is used to form the substrate, the following production method may be used. The polymer substrate is formed on a rigid base material such as glass by coating, affixation, or the like. An organic EL light-emitting device is then formed thereon. Subsequently, the rigid base material such as glass is removed.

Amorphous silicon nitride or silicon dioxide or the like may be used as the inorganic material to form inorganic films 22 and 27. A highly weather-resistant or heat-resistant polymer material such as polyimide or polyamide may be used as the polymer material to form polymer films 23 and 28. FIG. 3 shows an example in which first and second barrier films 24 and 29 each include a laminate of a single layer of inorganic film 22 or 27 and a single layer of polymer film 23 or 28. It will be understood that this example is non-limiting and that first and second barrier films 24 and 29 may include an alternating laminate of two or more layers of inorganic film 22 or 27 and two or more layers of polymer film 23 or 28.

Next, the material constituting each component of light emitter 26 will be described.

Anode 2 includes a highly conductive metal material such as aluminum, an aluminum alloy, or copper, or optically transparent IZO, ITO, tin oxide, indium oxide, zinc oxide, or any other high-conductivity metal oxide or metal sulfide. The method for forming anode 2 may be a thin film forming method such as vacuum deposition, sputtering, or ion plating.

The hole transport layer includes a polyvinyl carbazole-based material, a polysilane-based material, a polysiloxane derivative, a phthalocyanine compound such as copper phthalocyanine, an aromatic amine compound, or the like. The hole transport layer may be formed with a thickness of about 10 nm to about 200 nm using any of various coating methods. A hole injection layer may be stacked on the hole transport layer. The hole injection layer is provided to facilitate hole injection from anode 2. The hole injection layer may be formed by sputtering a metal oxide such as molybdenum oxide, vanadium oxide, or aluminum oxide, a metal nitride, or a metal oxynitride.

Light-emitting layer 3 includes, as a main component, an organic material capable of emitting fluorescence, phosphorescence, or the like, which is optionally doped with a dopant for improving the properties. An organic polymer material suitable for printing may be used, such as a polyvinyl carbazole derivative, a polyparaphenylene derivative, a polyfluorene derivative, or a polyphenylene vinylene derivative. The dopant is used to shift the emission wavelength or improve the emission efficiency. Many pigment dopants and metal complex dopants have been developed. Printing methods are suitable for forming light-emitting layer 3 on a large substrate. Among a variety of printing methods, inkjet printing should be used to form light-emitting layer 3 with a thickness of about 20 nm to about 200 nm.

The electron transport layer includes a benzoquinone derivative, a polyquinoline derivative, an oxadiazole derivative, or other materials. The electron transport layer may be formed using a vacuum deposition method or a coating method. In general, the electron transport layer is formed with a thickness of about 10 nm to about 200 nm. The electron injection layer may be formed by a vacuum deposition method or a coating method using barium, phthalocyanine, lithium fluoride, or other materials.

The material used to form cathode 4 depends on the direction in which light is extracted. When light is extracted from the cathode 4 side, cathode 4 includes an optically transparent conductive material such as ITO, IZO, tin oxide, or zinc oxide. When light is extracted from the anode 2 side, cathode 4 includes platinum, gold, silver, copper, tungsten, aluminum, an aluminum alloy, or the like. Cathode 4 may be formed with a thickness of about 50 nm to about 500 nm by sputtering or vacuum deposition.

In such a structure of the EL display device according to the present technique, polymer films 23 and 28 constituting first and second barrier films 24 and 29, respectively, each include a polymer material and at least one type of nano fine particles 31 selected from silica particles, Fe-based particles, montmorillonite particles, silica-coated particles, and zeolite particles, dispersed in the polymer material.

First and second barrier films 24 and 29 each includes inorganic film 22 or 27 and polymer film 23 or 28. If inorganic film 22 or 27 has a pin hole due to the influence of particles or the like, water passing through the pin hole may permeate through first and second barrier films 24 and 29, so that the barrier properties may decrease.

In the present technique, polymer films 23 and 28 stacked on inorganic films 22 and 27, respectively, each include a polymer material and at least one type of nano fine particles 31 selected from silica particles, Fe-based particles, montmorillonite particles, silica-coated particles, and zeolite particles, dispersed in the polymer material. Therefore, at least one type of nano fine particles 31 selected from silica particles, Fe-based particles, montmorillonite particles, silica-coated particles, and zeolite particles can react with water and adsorb water to prevent water from passing through first and second barrier films 24 and 29 and to sufficiently maintain the barrier properties of first and second barrier films 24 and 29.

Next, the present technique will be described in more detail.

In the present technique, the polymer film constituting the barrier film preferably has a thickness of 500 nm or more. The polymer film may include any of various organic materials such as polyurethane, polyester, polycarbonate, polyolefin, acrylate, polyvinyl, polyimide, polyamide, polyethylene terephthalate, and polyethylene naphthalate. Such organic materials may contain an initiating agent or an additive for dimensional stabilization or other purposes. The organic material in the polymer film is preferably in the form of a polymer for the formation of a dense inorganic film of an inorganic material. The polymer film does not have to be completely crosslinked and may contain a monomer, an oligomer, or the like.

The size of at least one type of nano fine particles selected from silica particles, Fe-based particles, montmorillonite particles, silica-coated particles, and zeolite particles may be defined in the direction where they have the largest projected area. Since the fine particles have a particle size distribution, the size of the fine particles may also be expressed as the mode particle size. In this case, the nano fine particles preferably have a mode particle size of 100 nm or less, more preferably 50 nm or less.

The content of the nano fine particles in the polymer film is preferably 50% by weight or less, more preferably 20% by weight or less. In this regard, it has been found that when nano fine particles are added to a polymer film, the barrier performance can be increased by increasing the amount of the added nanoparticles but as the added amount exceeds a certain level, the nano fine particles become aggregated so that the effect of adding the nano fine particles rather decreases. As a result of experiments for suitable addition amount, it has been found that when the content of the nano fine particles in the polymer film is 50% by weight or less, the nano fine particles can be made less likely to aggregate. It has also been found that considering variations in manufacturing process, the content of the nano fine particles in the polymer film should preferably be 20% weight or less.

When the content of the nano fine particles in the polymer film is 50% by weight or less, preferably 20% by weight or less, as stated above, the barrier properties can be improved without aggregation-induced reduction of the effect.

The polymer film with the nano fine particles dispersed therein can be formed by a coating method such as slit coating, die coating, printing such as silk screen printing, relief printing, or gravure printing, inkjet coating, or nozzle coating. Besides coating methods, a casting method, a drawing method, or the like may also be used. When these methods are used, some of the nano fine particles can be partially exposed from the surface part of the polymer film, so that the surface part of the polymer film can have irregularities, which are formed by some of the nano fine particles.

The inorganic material used to form the inorganic film may be $AlO_x$, $SiO_x$, $SiN_x$, or a mixture of $SiO_x$ and $SiN_x$. In many cases, the inorganic film is produced by CVD, sputtering, reactive vacuum deposition, or the like. The inorganic film may have a thickness of 10 nm to 500 nm per layer.

Next, specific examples of the barrier film according to the present technique will be described.

Example 1

Silica fine particles, $\alpha$-Fe/$Fe_3O_4$ fine particles, and montmorillonite fine particles as smectite-type layered compound particles were mixed into an epoxy acrylate resin for the polymer film of the barrier film. The mixture of the epoxy acrylate resin and the dispersed fine particles was applied by a die coating method. The resulting coating was then subjected to UV curing to form a film with an average thickness of 1,000 nm. Trimethylolpropane triacrylate was used as a solvent for the epoxy acrylate resin.

Before the mixing, the silica fine particles were surface-treated with 3-aminopropyltrimethoxysilane in a toluene solvent. The $\alpha$-Fe/$Fe_3O_4$ fine particles each had an internal part made of $\alpha$-Fe and a surface part made of $Fe_3O_4$. The surface of the $\alpha$-Fe/$Fe_3O_4$ fine particles was modified by treating with trimethylsilylpropyl methacrylate. The montmorillonite fine particles were mixed with dimethylacetamide before mixed into the resin. The content of the nano fine particles was 15% by weight.

A 200-nm-thick $SiN_x$ film was formed as the inorganic film of the barrier film by a CVD method.

Example 2

The same process as in Example 1 was used, except that the nano fine particles dispersed in the polymer film were the following two types: spherical silica particles with a mode particle size of 15 nm and spherical silica particles with a mode particle size of 40 nm and that the fine nano particles were added in an amount of 12% by weight.

In all the samples prepared in the examples, the fine particles in the polymer film efficiently adsorbed a small amount of water and oxygen molecules infiltrating from defects in the barrier film made of the inorganic material, so that the amount of passage of water and oxygen molecules could be significantly reduced.

As described above, the electronic device of the present technique includes first and second barrier films 24 and 29 and a device component sealed with first and second barrier films 24 and 29, in which first barrier film 24 includes a laminate of inorganic film 22 including an inorganic material and polymer film 23 including a polymer material, second barrier film 29 includes a laminate of inorganic film 27 including an inorganic material and polymer film 28 including a polymer material, and the device component includes TFT part 25, light emitter 26, and other parts. In addition, polymer films 23 and 28 each contain at least one type of nano fine particles 31 selected from silica particles, Fe-based particles, montmorillonite particles, silica-coated particles, and zeolite particles, dispersed in the polymer material.

Thanks to these features, even if inorganic film 22 or 27 has a pin hole due to the influence of particles or the like, water passing through the pin hole can be prevented from permeating through first and second barrier films 24 and 29, which makes it possible to prevent the barrier properties from deteriorating.

Exemplary embodiments have been described as illustrative of the technique of the present disclosure, and the attached drawings and the detailed description have been provided for that purpose.

It will be understood that the elements shown in the attached drawings and the detailed description may include not only elements indispensable for solving the problems but also elements that are for illustration of the technique and not indispensable for solving the problems. Therefore, such unnecessary elements should not be instantly recognized as being indispensable from the fact that they are shown in the drawings or the detailed description.

It will also be understood that since the exemplary embodiments are only illustrative of the technique of the present disclosure, modification, replacement, addition, omission, and the like may be made in various manners on the exemplary embodiments within the scope of claims or equivalents thereof.

The present technique described above is a useful invention for providing flexible EL display devices.

The invention claimed is:

1. An electronic device comprising:
    a first barrier film comprising a laminate of a first inorganic film comprising a first inorganic material and a first polymer film comprising a first polymer material;
    a second barrier film comprising a laminate of a second inorganic film comprising a second inorganic material and a second polymer film comprising a second polymer material; and
    a device component sealed by and disposed between the first and second barrier films, wherein:
    the second polymer film faces the first polymer film such that the second polymer film and the first polymer film are in direct contact with the device component,
    the first and second polymer films each contain at least one type of nano fine particles selected from silica particles, Fe-based particles, montmorillonite particles, silica-coated particles, and zeolite particles, dispersed in the first and second polymer materials, respectively, and
    two groups of nano fine particles having different mode particle sizes are used.

2. The electronic device according to claim 1, wherein the first and second polymer films each contain 50% by weight or less of the at least one type of nano fine particles.

3. The electronic device according to claim 1, wherein the first and second polymer films each contain 20% by weight or less of the at least one type of nano fine particles.

4. The electronic device according to claim 1, wherein the device component comprises a thin film transistor device and a light emitter.

5. The electronic device according to claim 4, wherein the device component further comprises a planarization layer such that the thin film transistor device is disposed between the light emitter and the planarization layer.

6. The electronic device according to claim 1, wherein the first and second polymer films each contain at least one type of nano fine particles selected from Fe-based particles and silica-coated particles.

* * * * *